US012086529B1

(12) United States Patent
Keller et al.

(10) Patent No.: US 12,086,529 B1
(45) Date of Patent: Sep. 10, 2024

(54) CIRCUIT DESIGN MODIFICATION USING TIMING-BASED YIELD CALCULATION

(71) Applicant: Cadence Design Systems, Inc., San Jose, CA (US)

(72) Inventors: Igor Keller, Pleasanton, CA (US); Eric K. Anderson, Livermore, CA (US); Yang Gao, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 418 days.

(21) Appl. No.: 17/691,974

(22) Filed: Mar. 10, 2022

(51) Int. Cl.
*G06F 30/398* (2020.01)
*G06F 30/3315* (2020.01)
*G06F 119/02* (2020.01)

(52) U.S. Cl.
CPC ........ *G06F 30/398* (2020.01); *G06F 30/3315* (2020.01); *G06F 2119/02* (2020.01)

(58) Field of Classification Search
CPC ...................................................... G06F 30/398
USPC ............................................................ 716/134
See application file for complete search history.

(56) References Cited

U.S. PATENT DOCUMENTS 10,430,536 B1 * 10/2019 Keller ................ G06F 30/3315
10,789,406 B1    9/2020 Raja et al.
11,210,448 B1 * 12/2021 Le ......................... G06F 30/398

* cited by examiner

*Primary Examiner* — Eric D Lee
(74) *Attorney, Agent, or Firm* — Schwegman Lundberg & Woessner, P.A.

(57) ABSTRACT

Various embodiments provide for using a timing-based yield calculation to modify a circuit design, which can be part of an electronic design automation (EDA) system. For instance, some embodiments use a timing-based yield calculation to modify one or more portions of the circuit design to improve timing of the circuit design (e.g., slack, slew, delay, etc.), the timing-based yield calculation of the circuit design, or both.

20 Claims, 6 Drawing Sheets

| ITERATION | YIELD PROBABILITY VALUE | MOVES FROM ITERATION | CUMULATIVE MOVES | ITERATION RUNTIME | CUMULATIVE RUNTIME | DELTA AREA | TOTAL AREA | %DELTA AREA |
|---|---|---|---|---|---|---|---|---|
| BEFORE 1st ITERATION | 0.058 | - | 0 | - | 0:00 | - | 37123.8 | - |
| 1 | 0.872 | 3215 | 3215 | 0:21 | 0:27 | 556.7 | 37680.5 | +1.5% |
| 2 | 0.924 | 90 | 3305 | 0:28 | 0:49 | 16.7 | 37697.2 | +0.05% |
| 3 | 0.984 | 193 | 3498 | 0:63 | 1:52 | 3.5 | 37700.7 | +0.01% |
| AFTER LAST ITERATION | 0.984 | | 3498 | | 1:52 | 576.9 | 37700.7 | +1.55% |

CIRCUIT DESIGN MODIFICATION USING TIMING-BASED YIELD CALCULATION

TECHNICAL FIELD

Embodiments described herein relate to circuit design and, more particularly, to systems, methods, devices, and instructions for using a timing-based yield calculation to modify a circuit design, which can be part of electronic design automation (EDA).

BACKGROUND

Variations in semiconductor processing of an integrated circuit can result in changes to performance and yield of integrated circuits manufactured. Performance of an integrated circuit can also be affected by one or more environmental variations, such as temperature and supply voltage variation. In view of this, semiconductor processing variations (and other variations) are often considered when an integrated circuit is being designed (e.g., using an EDA system) and static timing analysis (STA) is performed on the integrated circuit. In particular, STA is usually performed over a set of varying conditions (e.g., processing variations, temperature variations, voltage variations, etc.) and determines best- and worst-case timing delays of the integrated circuit independent of its inputs. In this way, STA can be used to determine how well an IC circuit design should perform and what levels of yield and reliability those IC circuit design should have.

BRIEF DESCRIPTION OF THE DRAWINGS

Various ones of the appended drawings merely illustrate example embodiments of the present disclosure and should not be considered as limiting its scope.

DETAILED DESCRIPTION

Various embodiments provide for using a timing-based yield calculation to modify a circuit design, which can be part of an EDA system. In particular, various embodiments described herein use a timing-based yield calculation to modify one or more portions of the circuit design to improve timing of the circuit design (e.g., slack, slew, delay, etc.), the timing-based yield calculation of the circuit design, or both. The modification can improve timing or the timing-based yield calculation of the circuit design at a low cost of power or area (e.g., small increase in power consumption by the circuit design, or small increase in area of the circuit design). By improving the timing, the time-based yield calculation (also referred to herein as a yield probability value), or both, various embodiments can improve or optimize the robustness of a circuit design. The use of various embodiments described herein can provide a circuit design with robustness (e.g., with respect to statistical timing and yield probability value) while obviating the need to overdesign the circuit design to provide the robustness.

According to various embodiments, a yield probability value is determined (e.g., generated or calculated) for a circuit design or a portion thereof (e.g., portion associated with one or more selected paths of the circuit design). The yield probability value can be generated as part of a process that generates a timing report for the circuit design. Based on the yield probability value, one or more paths of the circuit design are ranked according to their respective yield probability loss values (e.g., determined based on the percentage of yield probability loss they contribute), and a predetermined number of those paths having the largest yield probability loss values are identified. The identified paths are subsequently used (e.g., as a guide) in modifying one or more portions of the circuit design to improve or optimize their timing and yield probability value. In view of the identified paths, the circuit design can be modified in accordance with one or more parameters (e.g., limits, such as runtime of operation, power consumption limits, area limits, number of modifications made to the circuit design, a target yield probability value for the circuit design, etc.) set for the modification process. After modification, a yield probability value can be re-determined for the circuit or the portion thereof, and a decision can be made on whether additional modifications should be implemented to the circuit design based on the re-determined yield probability value.

For various embodiments described herein, a yield probability value for a circuit design is a metric determined (e.g., generated or calculated) based on data generated during timing analysis (static timing analysis (STA)) of the circuit design. As a metric, a yield probability value can represent a probability of whether a circuit design, or a portion thereof (e.g., portion associated with one or more selected paths of the circuit design), can meet one or more timing targets, or a timing specification, associated with the circuit design (e.g., how likely the circuit design will operate as expected at a target speed or frequency of operation). A yield probability value can be generated for all of a circuit design or for one or more portions of a circuit design, such as a portion associated with one or more select paths of the circuit design. For instance, an individual path (e.g., of a group of paths) can have an individual yield probability value, which can contribute to the yield probability value of a group of paths. Additionally, an individual path (e.g., of a group of paths) in a circuit design can have an associated yield probability loss value, which can represent a measure of loss (e.g., percent loss) the individual path contributes (e.g., causes) to the yield probability value of a group of paths. Accordingly, a group of paths can have an associated yield probability value and an associated probability loss value. A yield probability loss value of a given path (or a given group of paths) can be calculated by subtracting the value 1 by the yield probability value associated with the given path (or the given group of paths). With respect to a yield probability value of a path, the yield probability value can indicate the likelihood the path will at least meet target or timing specification of a circuit design (e.g., how likely the path will pass an operation test while the circuit design is operating at a target speed or frequency). Depending on the embodiment, a yield probability value can range in value from 0 to 1. For instance, a value of 1 for the yield probability value of a path (or a group of paths) can indicate that the path (or the group of paths) will meet target timing or specification of a circuit design.

A yield probability value can be generated for a group of paths of a circuit design selected by a user. The yield probability value of a path (or a group of paths) can be generated based on tracing the path (or the group of paths) to one or more specific endpoints in the circuit design (such as specific cell instances within the circuit design) and using the timing information (e.g., STA data) for the one or more traced paths. In particular, the yield probability value for the path (or the group of paths) can be generated using results of path timing analysis of the one or more traced paths. Based on path timing analysis, the yield probability value determination can account for path and stage correlations within a circuit design. Timing analysis data for a circuit design can comprise path delay and timing data, which can include arrival time results and the other parameters relevant to timing, such as required arrival time, slack, and a slack threshold.

For some embodiments, determining a yield probability value for a circuit design comprises accessing STA data for the circuit design, identifying a plurality of paths for performing timing analysis processing, where the plurality of paths comprise one or more stages, and performing path timing analysis on the plurality of paths, where common delay data (from the STA data) is used for analysis of the one or more stages shared by two or more paths of the plurality of paths and where a stage shared by different paths is represented by a same arrival time. The yield probability value is determined (e.g., generated or calculated) based on at least the path timing analysis. To identify the plurality of paths (for timing analysis processing), critical paths can be identified. For instance, the plurality of paths is identified by identifying a delay of each stage of the plurality of paths, and identifying worst case common stages based on the delays. Additionally, the yield probability value can be determined by determining a smallest slack at endpoints associated with the one or more paths of the plurality of paths. Various methodologies for generating (e.g., calculating) a yield probability value for a circuit design are described in U.S. Pat. No. 10,430,536, which is hereby incorporated by reference in its entirety.

As used herein, a yield probability value can also be referred to herein as a timing-based yield score, a parametric timing yield (PTY) value or score, or a parametric timing robustness (PTR) value or score. A yield probability loss value can also be referred to herein as PTY loss or PTR loss. Slack for an endpoint can comprise a required arrival time for the endpoint less a max of arrival time for each respective path that terminates at the endpoint. The process for generating a yield probability value of a circuit design (or a portion thereof) can be referred to as yield probability analysis, parametric timing robustness (PTR) analysis or parametric timing yield (PTY) analysis of a circuit design. The process implemented by various embodiments described herein can be referred to as parametric timing robustness (PTR)-based time optimization or parametric timing yield (PTY)-based timing optimization of a circuit design.

Reference will now be made in detail to embodiments of the present disclosure, examples of which are illustrated in the appended drawings. The present disclosure may, however, be embodied in many different forms and should not be construed as being limited to the embodiments set forth herein.

Figure 1:
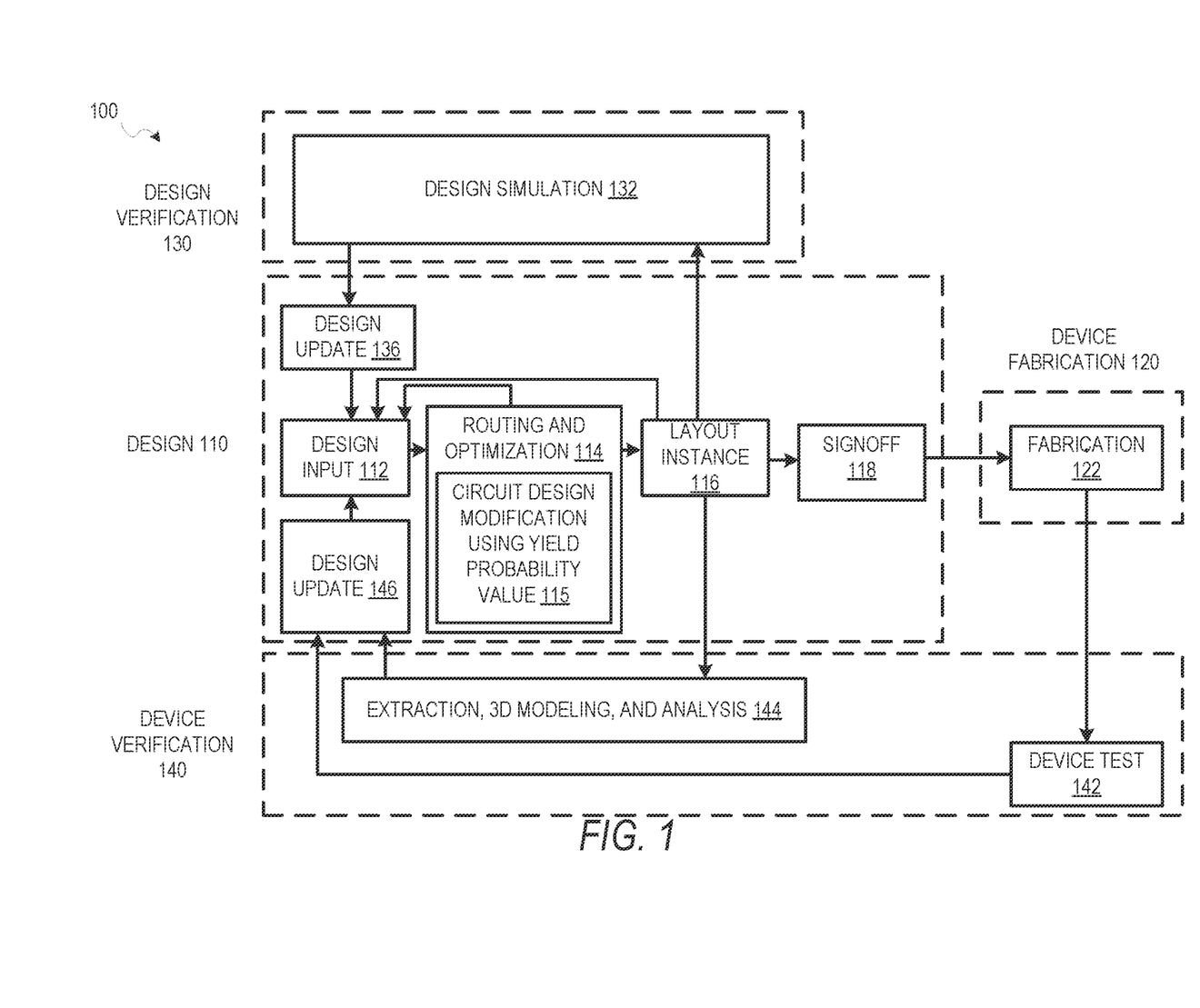
FIG. 1 is a diagram illustrating an example design process flow for using one or more yield probability values to modify a circuit design, according to some embodiments.

FIG. 1 is a diagram illustrating an example design process flow 100 for using one or more yield probability values to modify a circuit design, according to some embodiments. As shown, the design process flow 100 includes a design phase 110, a device fabrication phase 120, a design verification phase 130, and a device verification phase 140. The design phase 110 involves an initial design input 112 operation where the basic elements and functionality of a device are determined, as well as revisions based on various analyses and optimization of a circuit design. This design input 112 operation is where block instances are used in the circuit design and any additional circuitry for the design around the blocks is selected. The initial strategy, tactics, and context for the device to be created are also generated in the design input 112 operation, depending on the particular design algorithm to be used.

In some embodiments, following an initial selection of design values in the design input 112 operation, routing, timing analysis, and optimization are performed in a routing and optimization 114 operation, along with any other automated design processes. As shown, the routing and optimization 114 operation includes a circuit design modification using yield probability value 115 operation (hereafter, modification 115 operation), which may be performed in accordance with various embodiments described herein. The modification 115 operation can use one or more yield probability values, generated for a circuit design, to modify one or more portions of the circuit design to improve timing, yield probability value or both for the circuit design. The modification 115 operation can be regarded as implementing a yield probability value-based optimization of a circuit design. More regarding how the modification 115 operation can be performed is described herein with respect to FIG. 2.

While the design process flow 100 shows optimization occurring prior to a layout instance 116, routing, timing analysis and optimization may be performed at any time to verify operation of a circuit design. For instance, in various embodiments, timing analysis in a circuit design may be performed prior to routing of connections in the circuit design, after routing, during register transfer level (RTL) operations, or as part of a signoff 118, as described below.

After design inputs are used in the design input 112 operation to generate a circuit layout, and any of the routing and optimization 114 operations are performed, a layout is generated in the layout instance 116. The layout describes the physical layout dimensions of the device that match the design inputs. Prior to this layout being provided to a fabrication 122 operation, the signoff 118 is performed on the circuit design defined by the layout.

After signoff verification by the signoff 118, a verified version of the layout is used in the fabrication 122 operation to generate a device, or additional testing and design updates may be performed using designer inputs or automated updates based on design simulation 132 operations or extraction, three-dimensional (3D) modeling, and analysis 144 operations. Once the device is generated, the device can be tested as part of device test 142 operations and layout modifications generated based on actual device performance.

As described in more detail below, a design update 136 from the design simulation 132; a design update 146 from the device test 142 or the extraction, 3D modeling, and analysis 144 operations; or the design input 112 operation may occur after the initial layout instance 116 is generated. In various embodiments, whenever design inputs are used to update or change an aspect of a circuit design, a timing analysis and the routing and optimization 114 operation may be performed.

Figure 2:
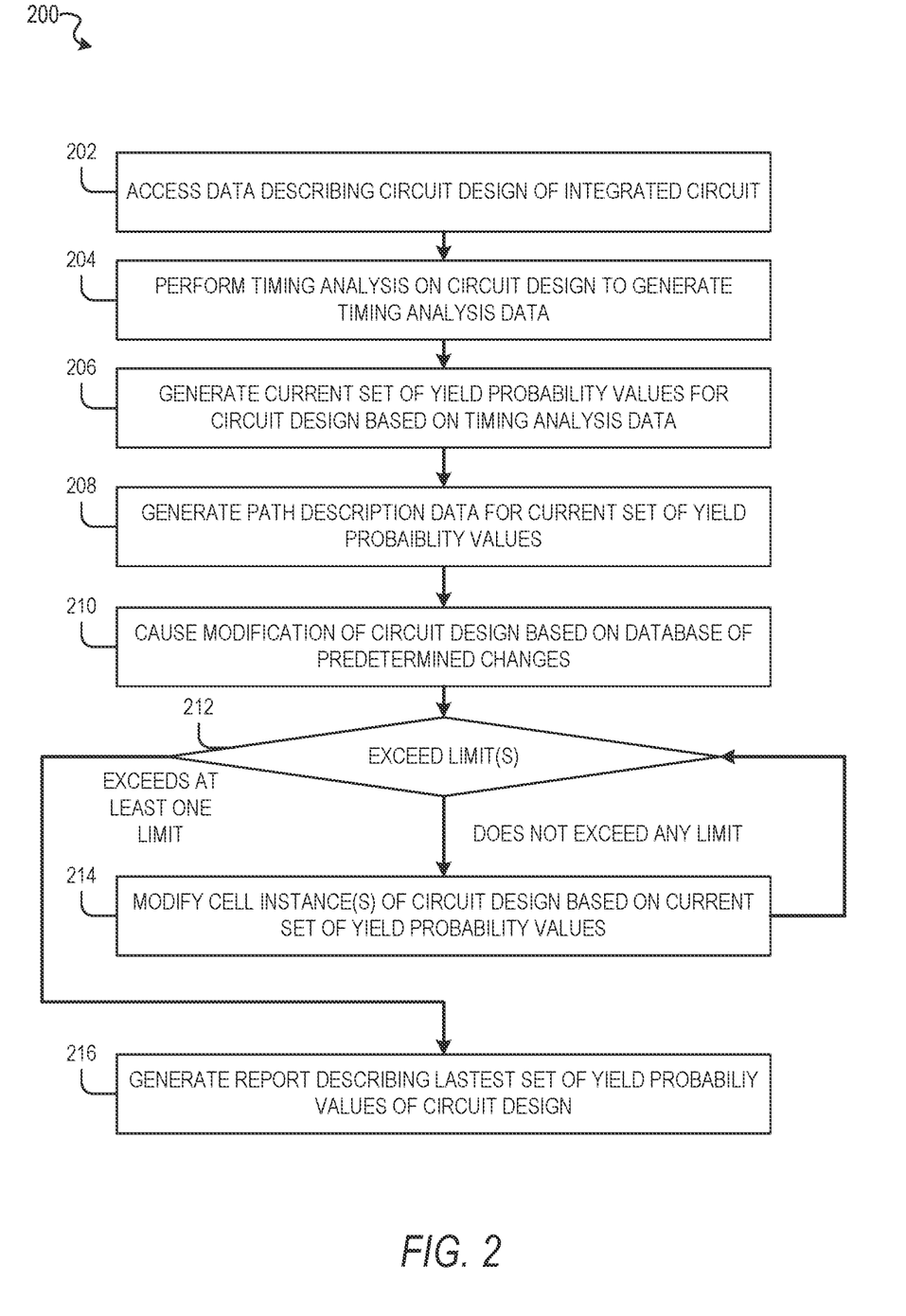
FIG. 2 is a flowchart illustrating an example method for using one or more yield probability values to modify a circuit design, according to some embodiments.

FIG. 2 is a flowchart illustrating an example method 200 for using one or more yield probability values to modify a circuit design, according to some embodiments, which can improve timing, a yield probability value, or both of the circuit design. It will be understood that example methods described herein may be performed by a device, such as a computing device executing instructions of an EDA software system, in accordance with some embodiments. Additionally, example methods described herein may be implemented in the form of executable instructions stored on a computer-readable medium or in the form of electronic circuitry. For instance, the operations of a method 200 of FIG. 2 may be represented by executable instructions that, when executed by a hardware processor of a computing device, cause the computing device to perform the method 200. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel. Depending on the embodiment, the method 200 can be performed after, or as part of, a timing analysis process performed on a circuit design.

Referring now to FIG. 2, operation 202 accesses data that describes a circuit design of an integrated circuit (IC), which can be manufactured using a semiconductor process that is subject to one or more semiconductor processing variations. The circuit design can comprise one or more nets that have components, such as cell instances, that are operatively coupled together by way of paths.

At operation 204, a timing analysis, such as static timing analysis (STA) or statistical STA, is performed on the circuit design to generate timing analysis data for the circuit design. The timing analysis data can comprise path timing analysis data for one or more select paths of the circuit design, where the path timing analysis data can include arrival time results and the other parameters relevant to timing, such as required arrival time, slack, and a slack threshold.

Thereafter, at operation 206, a current set of yield probability values is generated (e.g., calculated) for the circuit design based on timing analysis data for the circuit design generated by operation 204. Depending on the embodiment, the current set of yield probability values can be generated for the entirety of the circuit design or one or more paths of the circuit design (e.g., group of paths selected by a user). As described herein, various methodologies for generating (e.g., calculating) a yield probability value for a circuit design are described in U.S. Pat. No. 10,430,536, which is hereby incorporated by reference in its entirety. For some embodiments, the current set of yield probability values is provided as part of a report generated by a yield probability analysis process, which is performed on the circuit design (e.g., selected paths or selected endpoints of the circuit design).

At operation 208, path description data is generated, where the path description data describes a set of paths of the circuit design (e.g., group of paths selected by a user and paths traced to endpoints) used in the generating of the current set of yield probability values at operation 206. For some embodiments, the path description data describes a set of yield probability loss values associated with the set of paths, which can enable the set of paths to be ranked or sorted (e.g., within the path description data) based on the set of yield probability loss values (e.g., PTR-loss sorted path description data).

Subsequently, at operation 210, modification of the circuit design is caused, where the modification is based on a database of predetermined changes, based on the path description data (generated by operation 208), and based on the current set of yield probability values (generated by operation 206). By operation 210, the circuit design can be placed at a good starting point for performing one or more modifications based on yield probability values as described herein. During operation 210, the modification to the circuit design can be generated as a list of changes to the circuited data, where the list of changes can be used by an EDA system (e.g., placement and routing features or tools thereof) to implement the changes. For some embodiments, a set of metrics is generated for (a current version) of the circuit design and, based on the set of metrics, a determination can be made as to whether one or more predetermined changes, from the database, can be applied to the circuit design. Individual predetermined changes of the database can represent a quick modification (e.g., improvement) to a circuit design that can be applied while maintaining the slack sigma of the circuit design. According to some embodiments, the database of predetermined modifications comprises one or more engineering change orders (ECOs) for one or more cell instance of a circuit design.

After operation 210 (or operation 214), at operation 212, a determination is made as to whether the circuit design exceeds a set of limits for the circuit design (e.g., as modified by operation 210 or operation 214). The set of limits can include, without limitation, one or more of the following: power consumption of the circuit design (e.g., limit power available to the circuit design); area (e.g., silicon area) of the circuit design (e.g., limit area available for circuit design); and a target yield probability value for the circuit design (e.g., target PTR score). Additionally, the set of limits can include one or more limits that relate to one or more operations of the method 200, such as a limit to the number of modifications applied by operation 210 or 214, or a runtime limit of at least a portion of an operation of the method 200 (e.g., limit to runtime of operation 214 or limit to runtime of individual iterations of operation 214). Depending on the embodiment, one or more of the set of limits can be defined by a user (e.g., based on user preferences).

In response to determining that no limit in the set of limits is exceeded (e.g., the circuit design does not exceed any limit and the method 200 does not exceed any limit), the method 200 proceeds to operation 214. In response to determining that at least one limit in the set of limits is exceeded (e.g., the circuit design exceeds a limit or the method 200 exceeds a limit), the method 200 proceeds to operation 216.

At operation 214, one or more cell instances of the circuit design are modified (or remodified after a first iteration of operation 214) based on the current set of yield probability values and the path description data. The modification of the one or more cell instances can represent optimization of one or more objects of the circuit design based on the current set of yield probability values associated with those objects. According to some embodiments, operation 214 comprises determining (e.g., identifying), based on the path description data generated at operation 208, a subset of paths from the set of paths. The subset of paths can include a predetermined number (e.g., 1000) of paths from the set of paths that are associated with largest yield probability loss values (e.g., 1000 paths with highest loss values). This set of paths can represent a collection of N-paths having the worst-case slack values based on the current set of yield probability values. For each single path in the identified subset of paths, a set of lossy cell instances of the circuit design can be determined (e.g., identified), where each lossy cell instance in the set contributes the most loss to the current set of yield probability values of the circuit design. In particular, the set of lossy cell instances can be determined by performing slack-based analysis (e.g., bottleneck analysis) on one or more cell instances of the circuit design that are coupled to the single path. For instance, the slack-based analysis can comprise using slack sigmas (e.g., previous, current, and next slack sigma from timing analysis data) to identify variation gains in every cell instance in the one or more cell instances, and identify critical cell instances (e.g., those with critical timing issues) as lossy cell instances.

During operation 214, for each single lossy cell instance in the set of lossy cell instances, one or more predetermined modifications (e.g., transformations) can be applied in association with the single lossy cell instance. Applying one or more predetermined modifications (e.g., from a collection of predetermined modifications) in association with the single lossy cell instance can comprise determining a set of related paths that are associated with (e.g., operatively coupled to) the single lossy cell instance, and trying application of the one or more predetermined modifications individually (in association with the single lossy cell instance) to identify a select predetermined modification (from the one or more predetermined modifications) based on a loss impact of the select predetermined modification on the set of related paths. The determination of the set of related paths can effectively identify a cloud of paths around the single lossy cell instance. The set of related paths associated with the single lossy cell instance can include, for example, fan-in paths to the single lossy instance and fan-out paths from the single lossy instance.

For some embodiments, application of the predetermined modifications can be tried according to an order. For instance, application of individual predetermined modifications, from the one or more predetermined modifications, can be performed individually and according to an order that is determined based on severity of change caused to the circuit design by an individual predetermined modification (e.g., how disruptive the modification is to the circuit design). In this way, some embodiments can try individual predetermined modifications in order from the least disruptive predetermined modification to the most disruptive predetermined modification. Additionally, the predetermined modifications tried can be limited to, for example, the number of predetermined modifications tried (e.g., from least disruptive to most disruptive) or select predetermined modifications (e.g., from a collection of predetermined modifications). Limiting the predetermined modifications tried can limit the number of moves evaluated by each iteration of operation 214.

After each predetermined modification tried on the circuit design, the loss over each path in the set of related paths (caused by the tried predetermined modification) is evaluated. This can result in a loss impact (e.g., timing loss or yield probability loss value) being determined (e.g., calculated) for each of the predetermined modifications tried. For instance, when application of a single predetermined modification is being tried, a current yield probability loss value associated with the set of related paths can be determined (e.g., accessed or generated), where the current yield probability loss value can be generated by a yield probability analysis performed on the set of related paths. Additionally, current timing analysis data associated with the set of related paths can be determined (e.g., accessed or generated), where the current timing analysis data can be generated by a timing analysis process (e.g., STA) performed on the circuit design. Subsequently, the single predetermined modification can be applied in association with a single lossy cell instance that is currently being operated upon. After application of the single predetermined modification, a new yield probability loss value associated with the set of related paths can be determined (e.g., generated), where the new yield probability loss value can be generated by reperforming the yield probability analysis performed on the set of related paths. Additionally, after application of the single predetermined modification, new time analysis data associated with the set of related paths can be determined (e.g., generated), where the time analysis data can be generated by reperforming the timing analysis process (e.g., STA) on the circuit design. Thereafter, a loss impact of the single predetermined modification on the set of related paths can be calculated by comparing (e.g., determining the difference between) the current yield probability loss value and the new yield probability loss value and by comparing (e.g., determining the difference between) the current timing analysis data and the new timing analysis data. Eventually, after the loss impact is determined (e.g., calculated) for each of the predetermined modifications tried on the single lossy instance, we are left with a set of loss impacts results corresponding to the predetermined modifications tried. Based on the set of loss impacts, a select predetermined modification can be determined (e.g., identified) from the predetermined modifications tried, where the select predetermined modification is associated with a smallest loss impact in the set of loss impacts. The select predetermined modification can represent a best candidate modification to be applied in association with the single lossy cell instance.

For some embodiments, while trying application of individual predetermined modifications, if a loss impact of zero (zero-loss impact) is detected for an individual predetermined modification, then the individual predetermined modification is selected as the good candidate modification (from the one or more predetermined modifications) and no additional predetermined modifications from the one or more predetermined modifications are tried.

Examples of predetermined modifications can include, without limitation, one or more modifications that: resizes the lossy cell instance; swaps the single lossy cell instance with another cell instance having a different voltage threshold (VT) cell instance (e.g., a high-VT version of a cell instance with a low-VT version of the same cell instance, where the high-VT cell and low-VT cell versions share the same pin locations but the high-VT version operates slower but with lower power consumption than the low-VT version); swaps one or more buffers associated with the single lossy cell instance; swaps a buffer cell for a delay cell; or comprises a plurality of predetermined modifications (e.g., movements) per a path of the circuit design. Of the example predetermined modifications, resizing a cell instance represents a modification that is least likely to result in movement of cell instances within a circuit design (e.g., during placement and routing of the circuit design) and, as such, the least disruptive to the circuit design. Of the example predetermined modifications, the plurality of predetermined modifications per a path of the circuit design can represent modifications that are most likely to result in movement of cell instances within a circuit design and, as such, the most disruptive to the circuit design.

After operation 214, the method 200 can return to operation 212 and redetermine whether the circuit design (or an operation of the method 200) has exceeded any limit in the set of limits. In response to redetermining that no limit in the set of limits is exceeded, the method 200 proceeds to operation 214. In response to redetermining that at least one limit in the set of limits is exceeded, the method 200 proceeds to operation 216.

At operation 216, a report is generated that describes a latest (e.g., last generated) set of yield probability values of the circuit design. In addition to the latest set of yield probability values, the report can describe various timing information for the circuit design, such as slack, delay, and slew. For some embodiments, the report can provide before and after values for one or more of: yield probability values; runtime of the overall process; area of the circuit design; number of moves caused; or power consumption of the circuit design. Additionally, or alternatively, the report can provide such values for each iteration of operation 214.

Figure 3:
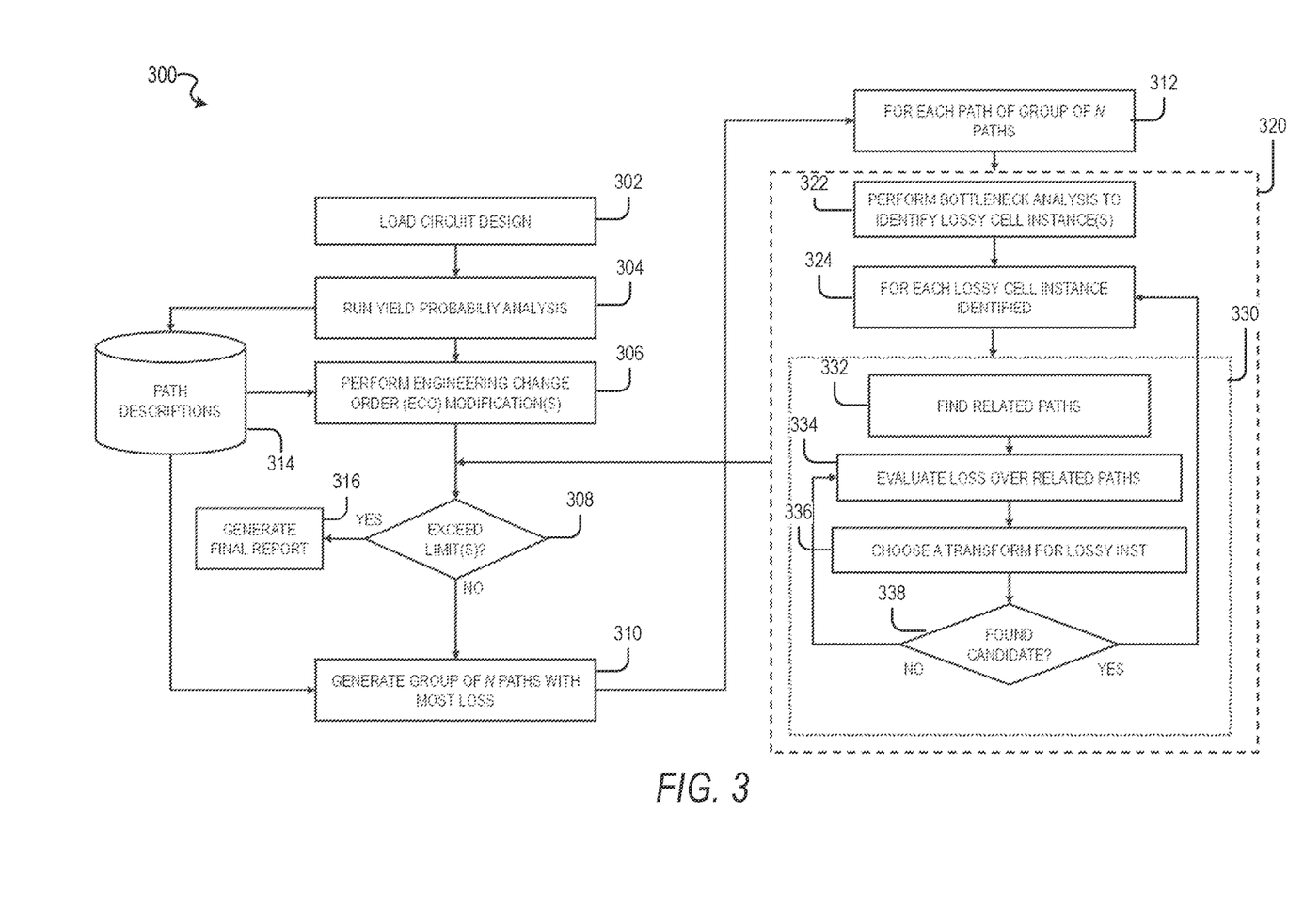
FIG. 3 is a flowchart illustrating an example method for using one or more yield probability values to modify a circuit design, according to some embodiments.

FIG. 3 is a flowchart illustrating an example method 300 for using one or more yield probability values to modify a circuit design, according to some embodiments. In particular, the method 300 can represent an example of an implementation of the method 200 of FIG. 2.

Referring now to FIG. 3, a circuit design is loaded at operation 302 and, at operation 304, a yield probability analysis is performed on the circuit design, which can generate a report for the circuit design. Based on the yield probability analysis performed at operation 304, path description data associated with the yield probability analysis can be generated and stored at operation 314. Using the path description data and the report generated by the yield probability analysis at operation 304, one or more engineering change order (ECO) modifications can be performed on the circuit design at operation 306.

Following operation 306, it is determined at operation 308 whether any limits for the circuit design (or an operation of the method 300) have been exceeded. If it is determined (at operation 308) that at least one limit has been exceeded, the method 300 can continue to operation 316, where a final report is generated for the yield probability value-based modification of the circuit design. Example output from such a final report is illustrated with respect to FIG. 4. If it is determined (at operation 308) that no limits have been exceeded, a group of N paths that exhibit the most loss is generated (e.g., identified) at operation 310 based on at least the path description data generated and stored by operation 314. N can represent a default or user-defined number of paths that is to be considered during operation 312 (e.g., N=1000). After operation 310, operation 312 causes operation 320 to be performed for each path in the group of N paths.

When operation 320 is operating on an individual path, a bottleneck analysis is performed at operation 322 on the individual path to identify one or more lossy instances associated with the individual path. Subsequently, operation 324 causes operation 330 to be performed for each lossy cell instance identified by operation 322. When operation 330 is operating on an individual lossy cell instance, one or more paths related to the individual lossy cell instance are found at operation 332. At operation 334, loss is evaluated for the one or more related paths prior to trying any transformations on the individual lossy cell instance. At operation 336, a transformation is chosen and applied on the individual lossy cell instance and, at operation 338, it is determined whether the transformation is a good candidate transformation for the lossy cell instance. If the applied transformation is a good candidate (e.g., has zero-loss impact), the applied transformation is selected for the lossy cell instance, no additional transformations are tried for the lossy cell instance, and the method 300 returns to operation 324. If the applied transformation is not a good candidate, the method 300 returns to operation 334, the one or more related paths are evaluated for loss based on the applied transformation, and at operation 336, another transformation is applied with respect to the lossy cell instance. Eventually, after operation 320 is performed with respect to each path in the group of N paths, the method 300 returns to operation 308 to determine whether the circuit design (or an operation of the method 300) exceeds a limit.

Figure 4:
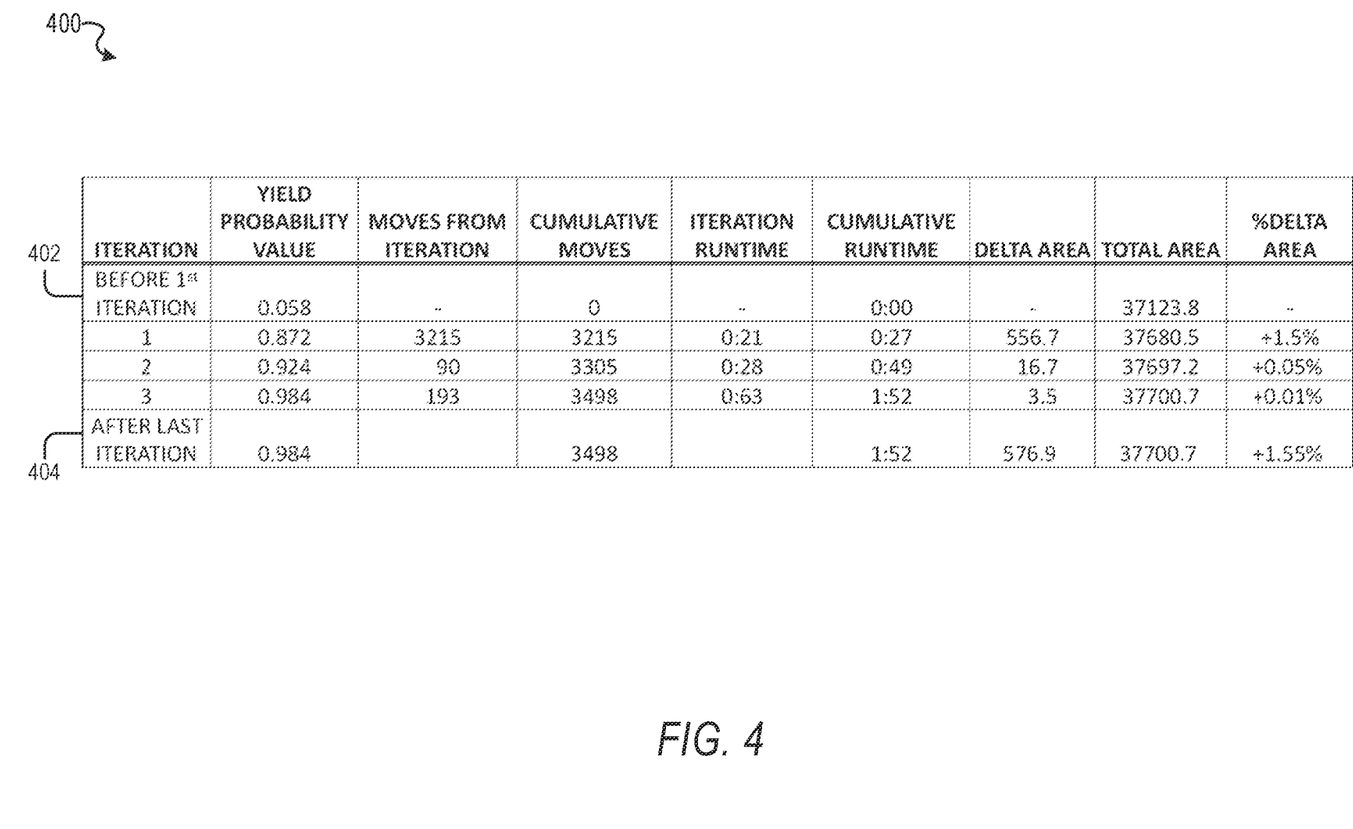
FIG. 4 is a table illustrating data from an example report by a yield probability value-based modification of a circuit design, according to some embodiments.

FIG. 4 is a table 400 illustrating data from an example report by a yield probability value-based modification of a circuit design, according to some embodiments. As illustrated, the table 400 includes the before, during, and after values for the following: yield probability value; moves caused by an iteration (e.g., of operation 320 of the method 300 of FIG. 3); cumulative moves caused by all iterations (e.g., of operation 320); runtime of iteration (e.g., of operation 320); cumulative runtime of all iterations (e.g., of operation 320); circuit design area caused by an iteration (e.g., of operation 320); total circuit design area caused by all iterations (e.g., of operation 320); and percentage of circuit design area change caused by an iteration (e.g., of operation 320). Row 402 of the table 400 includes values determined prior to any iterations (e.g., of operation 320) of a yield probability value-based modification to the circuit design being performed, while row 404 of the table 400 includes values determined after all iterations (e.g., of operation 320) of the yield probability value-based modifications to a circuit design are performed. As shown, three iterations (e.g., of operation 320) of the yield probability value-based modifications have a total runtime of 1:52, resulted in 3498 moves of objects (e.g., cell instances) of the circuit design, and resulted in an area increase of 576.9 units (over the initial 37123.8 units), which represents a 1.55% change in delta area. Though not shown, the report can also include information regarding impact on power consumption by each iteration, and all the iterations, of the yield probability value-based modification of the circuit design.

Figure 5:
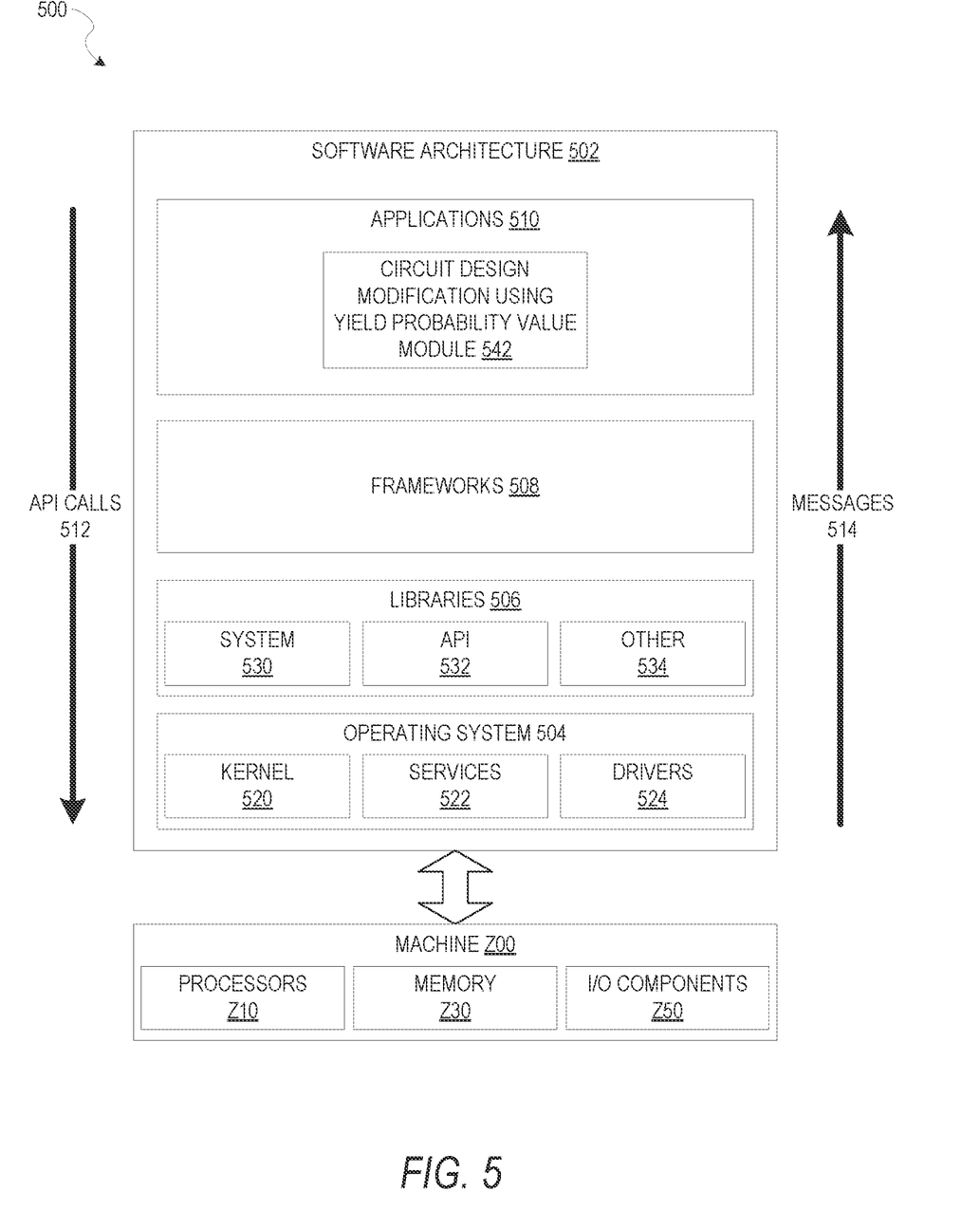
FIG. 5 is a block diagram illustrating an example of a software architecture that may be operating on an EDA computing device and may be used with methods for using one or more yield probability values to modify a circuit design, according to some embodiments.

FIG. 5 is a block diagram 500 illustrating an example of a software architecture 502 that may be operating on an EDA computer and may be used with methods for using one or more yield probability values to modify a circuit design, according to some example embodiments. The software architecture 502 can be used as an EDA computing device to implement any of the methods described above.

FIG. 5 is merely a non-limiting example of a software architecture 502, and it will be appreciated that many other architectures can be implemented to facilitate the functionality described herein. In various embodiments, the software architecture 502 is implemented by hardware such as a machine 600 of FIG. 6 that includes processors 610 (e.g., hardware processors), memory 630, and I/O components 650. In this example, the software architecture 502 can be conceptualized as a stack of layers where each layer may provide a particular functionality. For example, the software architecture 502 includes layers such as an operating system 504, libraries 506, software frameworks 508, and applications 510. Operationally, the applications 510 invoke application programming interface (API) calls 512 through the software stack and receive messages 514 in response to the API calls 512, consistent with some embodiments. In various embodiments, any client device, any server computer of a server system, or any other device described herein may operate using elements of the software architecture 502. An EDA computing device described herein may additionally be implemented using aspects of the software architecture 502, with the software architecture 502 adapted for using one or more yield probability values to modify a circuit design in any manner described herein.

Figure 6:
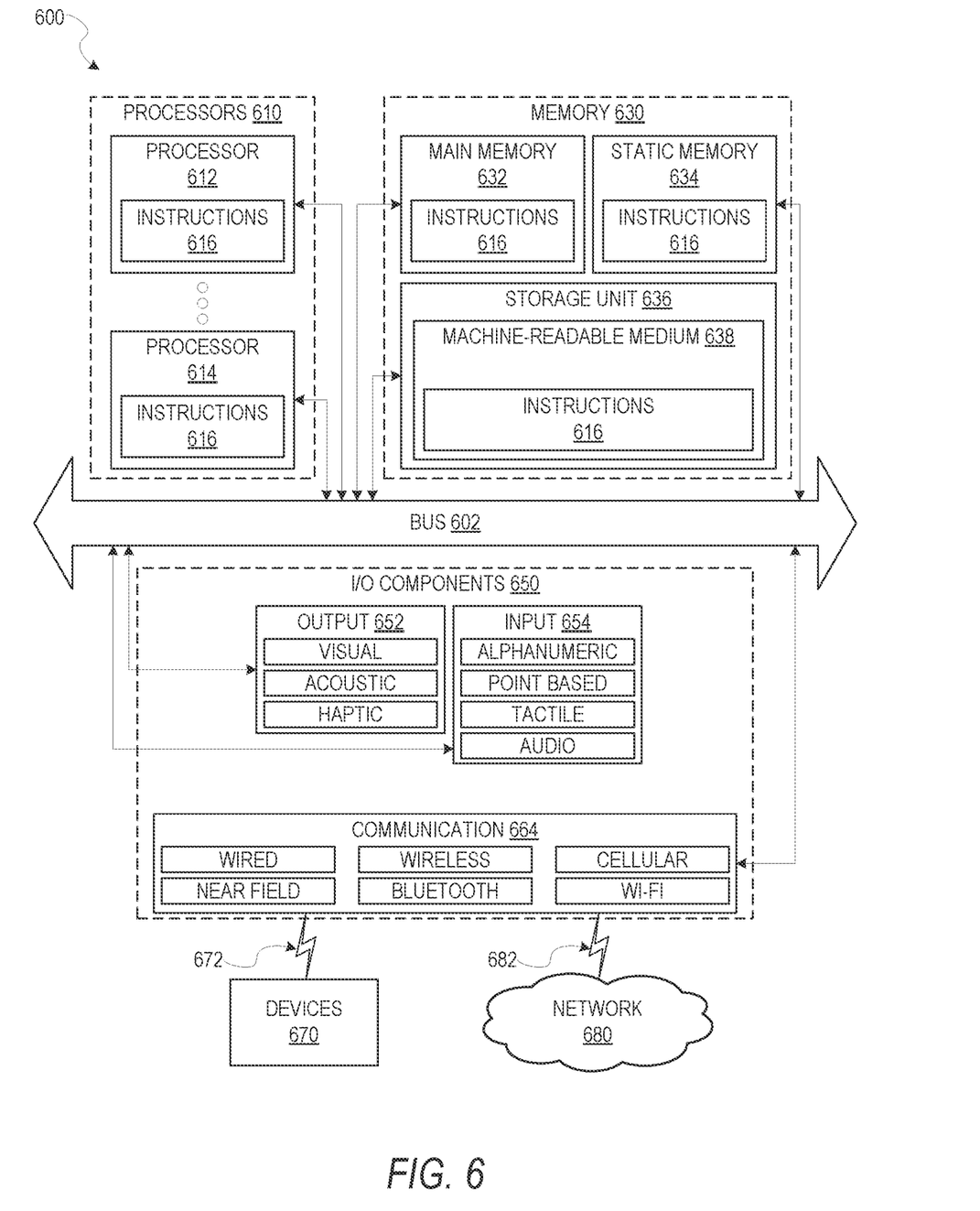
FIG. 6 is a diagram representing a machine in the form of a computer system within which a set of instructions are executed, causing the machine to perform any one or more of the methods discussed herein, according to some example embodiments.

In one embodiment, an EDA application of the applications 510 enables and facilitates use of one or more yield probability values to modify a circuit design according to embodiments described herein using various modules within the software architecture 502. For example, in one embodiment, an EDA computing device similar to the machine 600 includes the memory 630 and the one or more processors 610. The processors 610 also implement a circuit design modification using yield probability value module 542 (hereafter, circuit design modification module 542) for using one or more yield probability values to modify a circuit design in accordance with various embodiments described herein.

In various other embodiments, rather than being implemented as modules of the one or more applications 510, the circuit design modification module 542 may be implemented using elements of the libraries 506, the operating system 504, or the software frameworks 508.

In various implementations, the operating system 504 manages hardware resources and provides common services. The operating system 504 includes, for example, a kernel 520, services 522, and drivers 524. The kernel 520 acts as an abstraction layer between the hardware and the other software layers, consistent with some embodiments. For example, the kernel 520 provides memory management, processor management (e.g., scheduling), component management, networking, and security settings, among other functionality. The services 522 can provide other common services for the other software layers. The drivers 524 are responsible for controlling or interfacing with the underlying hardware, according to some embodiments. For instance, the drivers 524 can include display drivers, signal-processing drivers to optimize modeling computation, memory drivers, serial communication drivers (e.g., Universal Serial Bus (USB) drivers), WI-FI® drivers, audio drivers, power management drivers, and so forth.

In some embodiments, the libraries 506 provide a low-level common infrastructure utilized by the applications 510. The libraries 506 can include system libraries 530 such as libraries of blocks for use in an EDA environment or other libraries that can provide functions such as memory allocation functions, string manipulation functions, mathematic functions, and the like. In addition, the libraries 506 can include API libraries 532 such as media libraries (e.g., libraries to support presentation and manipulation of various media formats such as Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 506 may also include other libraries 534.

The software frameworks 508 provide a high-level common infrastructure that can be utilized by the applications 510, according to some embodiments. For example, the software frameworks 508 provide various graphical user interface (GUI) functions, high-level resource management, high-level location services, and so forth. The software frameworks 508 can provide a broad spectrum of other APIs that can be utilized by the applications 510, some of which may be specific to a particular operating system 504 or platform. In various embodiments, the systems, methods, devices, and instructions described herein may use various files, macros, libraries, and other elements of an EDA design environment to implement usage of one or more yield probability values to modify a circuit design as described herein. This includes analysis of input design files for an integrated circuit design, along with any element of hierarchical analysis that may be used as part of or along with the embodiments described herein. While netlist files, library files, SDC files, and view definition files are examples that may operate within the software architecture 502, it will be apparent that other files and structures may provide a similar function, in various embodiments.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an application-specific integrated circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 600 including processors 610), with these operations being accessible via a network (e.g., the Internet) and via one or more appropriate interfaces (e.g., an API). In certain embodiments, for example, a client device may relay or operate in communication with cloud computing systems and may access circuit design information in a cloud environment.

The performance of certain of the operations may be distributed among the processors, not only residing within a single machine 600, but deployed across a number of machines 600. In some example embodiments, the processors 610 or processor-implemented modules are located in a single geographic location (e.g., within a home environment, an office environment, or a server farm). In other example embodiments, the processors or processor-implemented modules are distributed across a number of geographic locations.

FIG. 6 is a diagrammatic representation of the machine 600 in the form of a computer system within which a set of instructions may be executed for causing the machine 600 to perform any one or more of the methodologies discussed herein, according to an example embodiment. FIG. 6 shows components of the machine 600, which is, according to some embodiments, able to read instructions from a machine-readable medium (e.g., a machine-readable storage medium) and perform any one or more of the methodologies discussed herein. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein can be executed. In alternative embodiments, the machine 600 operates as a standalone device or can be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 can comprise, but not be limited to, a server computer, a client computer, a personal computer (PC), a tablet computer, a laptop computer, a netbook, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

In various embodiments, the machine 600 comprises processors 610, memory 630, and input/output (I/O) components 650, which can be configured to communicate with each other via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) include, for example, a processor 612 and a processor 614 that may execute the instructions 616. The term "processor" is intended to include multi-core processors 610 that may comprise two or more independent processors 612, 614 (also referred to as "cores") that can execute the instructions 616 contemporaneously. Although FIG. 6 shows multiple processors 610, the machine 600 may include a single processor 612 with a single core, a single processor 612 with multiple cores (e.g., a multi-core processor 612), multiple processors 610 with a single core, multiple processors 610 with multiple cores, or any combination thereof.

The memory 630 comprises a main memory 632, a static memory 634, and a storage unit 636 accessible to the processors 610 via the bus 602, according to some embodiments. The storage unit 636 can include a machine-readable medium 638 on which are stored the instructions 616 embodying any one or more of the methodologies or functions described herein. The instructions 616 can also reside, completely or at least partially, within the main memory 632, within the static memory 634, within at least one of the processors 610 (e.g., within the processor's cache memory), or any suitable combination thereof, during execution thereof by the machine 600. Accordingly, in various embodiments, the main memory 632, the static memory 634, and the processors 610 are considered machine-readable media 638.

As used herein, the term "memory" refers to a machine-readable medium 638 able to store data temporarily or permanently and may be taken to include, but not be limited to, random-access memory (RAM), read-only memory (ROM), buffer memory, flash memory, and cache memory. While the machine-readable medium 638 is shown, in an example embodiment, to be a single medium, the term "machine-readable medium" should be taken to include a single medium or multiple media (e.g., a centralized or distributed database, or associated caches and servers) able to store the instructions 616. The term "machine-readable medium" shall also be taken to include any medium, or combination of multiple media, that is capable of storing instructions (e.g., the instructions 616) for execution by a machine (e.g., the machine 600), such that the instructions, when executed by one or more processors of the machine (e.g., the processors 610), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 650 include a wide variety of components to receive input, provide output, produce output, transmit information, exchange information, capture measurements, and so on. In general, it will be appreciated that the I/O components 650 can include many other components that are not shown in FIG. 6. The I/O components 650 are grouped according to functionality merely for simplifying the following discussion, and the grouping is in no way limiting. In various example embodiments, the I/O components 650 include output components 652 and input components 654. The output components 652 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 654 include alphanumeric input components (e.g., a keyboard, a touch screen configured to receive alphanumeric input, a photo-optical keyboard, or other alphanumeric input components), point-based input components (e.g., a mouse, a touchpad, a trackball, or other pointing instruments), tactile input components (e.g., a physical button, a touch screen that provides location and force of touches or touch gestures, or other tactile input components), audio input components (e.g., a microphone), and the like.

In some embodiments, outputs from an EDA computing device may include design documents, files for additional steps in a design flow, or outputs for circuit fabrication. As described herein, "constraints," "requirements," "design elements," and other aspects of a circuit design refer to selectable values that are set as part of the design of a circuit. Such design constraints, requirements, or elements may be adjusted by a system operator or circuit designer to suit the particular goals of a project or circuit that results from the operations described herein.

Communication can be implemented using a wide variety of technologies. The I/O components 650 may include communication components 664 operable to couple the machine 600 to a network 680 or devices 670 via a coupling 682 and a coupling 672, respectively. For example, the communication components 664 include a network interface component or another suitable device to interface with the network 680. In further examples, the communication components 664 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 670 may be another machine or any of a wide variety of peripheral devices (e.g., a peripheral device coupled via a USB).

In various example embodiments, one or more portions of the network 680 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling.

Furthermore, the machine-readable medium 638 is non-transitory (in other words, not having any transitory signals) in that it does not embody a propagating signal. However, labeling the machine-readable medium 638 "non-transitory" should not be construed to mean that the machine-readable medium 638 is incapable of movement; the machine-readable medium 638 should be considered as being transportable from one physical location to another. Additionally, since the machine-readable medium 638 is tangible, the machine-readable medium 638 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. The terms "a" or "an" should be read as meaning "at least one," "one or more," or the like. The use of words and phrases such as "one or more," "at least," "but not limited to," or other like phrases shall not be read to mean that the narrower case is intended or required in instances where such broadening phrases may be absent.

Boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, devices, instructions, and computer media (e.g., computing machine program products) that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A non-transitory computer-readable medium comprising instructions that, when executed by a hardware processor of a device, cause the device to perform operations comprising:
   accessing data that describes a circuit design for an integrated circuit;
   generating a current set of yield probability values for the circuit design based on static timing analysis data for the circuit design;
   generating path description data that describes a set of paths of the circuit design used in the generating of the current set of yield probability values, and describes a set of yield probability loss values associated with the set of paths;
   determining whether the circuit design exceeds a set of limits for the circuit design; and
   in response to determining that the circuit design does not exceed any limit in the set of limits, modifying one or more cell instances of the circuit design based on the current set of yield probability values and the path description data.

2. The non-transitory computer-readable medium of claim 1, wherein the modifying of the one or more cell instances of the circuit design based on the current set of yield probability values and the path description data comprises:
   determining, based on the path description data, a subset of paths from the set of paths, the subset of paths including a predetermined number of paths from the set of paths that are associated with largest yield probability loss values; and
   for each single path in the subset of paths:
      determining a set of lossy cell instances that contribute a most loss to the current set of yield probability values by performing slack-based analysis on one or more cell instances of the circuit design that are operatively coupled to the single path; and
      for each single lossy cell instance in the set of lossy cell instances, applying one or more predetermined modifications in association with the single lossy cell instance.

3. The non-transitory computer-readable medium of claim 2, wherein the one or more predetermined modifications include a predetermined modification that resizes the single lossy cell instance.

4. The non-transitory computer-readable medium of claim 2, wherein the one or more predetermined modifications include a predetermined modification that swaps the single lossy cell instance with another version of a same cell instance having a different voltage threshold.

5. The non-transitory computer-readable medium of claim 2, wherein the one or more predetermined modifications include a predetermined modification that swaps one or more buffers associated with the single lossy cell instance.

6. The non-transitory computer-readable medium of claim 2, wherein the one or more predetermined modifications comprise a plurality of predetermined modifications per a path of the circuit design.

7. The non-transitory computer-readable medium of claim 2, wherein the one or more predetermined modifications include a predetermined modification that swaps a buffer cell for a delay cell.

8. The non-transitory computer-readable medium of claim 2, wherein the applying of the one or more predetermined modifications in association with the single lossy cell instance comprises:
   determining a set of related paths that are associated with the single lossy cell instance; and
   trying application of the one or more predetermined modifications in association with the single lossy cell instance to identify a select predetermined modification from the one or more predetermined modifications based on a loss impact of the select predetermined modification on the set of related paths.

9. The non-transitory computer-readable medium of claim 8, wherein application of individual predetermined modifications, from the one or more predetermined modifications, is performed individually and according to an order, the order being determined based on severity of change caused to the circuit design by an individual predetermined modification.

10. The non-transitory computer-readable medium of claim 8, wherein the trying the application of the one or more predetermined modifications in association with the single lossy cell instance to identify the select predetermined modification comprises:
   determining a set of loss impacts for the one or more predetermined modifications, the determining of the set of loss impacts comprising, for each single predetermined modification from the one or more predetermined modifications, trying application of the single predetermined modification by:
      determining a current yield probability loss value associated with the set of related paths;
      determining current static timing analysis data associated with the set of related paths;
      applying the single predetermined modification in association with the single lossy cell instance;
      determining a new yield probability loss value associated with the set of related paths after the applying of the single predetermined modification;

determining new static timing analysis data associated with the set of related paths after the applying of the single predetermined modification; and calculating a loss impact of the single predetermined modification on the set of related paths based on a comparison of the current yield probability loss value and the new yield probability loss value and a comparison of the current static timing analysis data and new static timing analysis data; and identifying, based on the set of loss impacts, the select predetermined modification in the one or more predetermined modifications, the select predetermined modification being associated with a smallest loss impact in the set of loss impacts.

11. The non-transitory computer-readable medium of claim 8, wherein the trying the application of the one or more predetermined modifications in association with the single lossy cell instance to identify the select predetermined modification comprises:

trying each single predetermined modification, from the one or more predetermined modifications, until a predetermined modification associated with a zero-loss impact is identified.

12. The non-transitory computer-readable medium of claim 1, wherein the operations comprise:

prior to the determining of whether the circuit design exceeds the set of limits for the circuit design, causing modification of the circuit design based on a database of predetermined changes, based on the path description data, and based on the current set of yield probability values.

13. The non-transitory computer-readable medium of claim 1, wherein the operations comprise:

after the modifying the one or more cell instances based on the current set of yield probability values and the path description data:

redetermining whether the circuit design exceeds the set of limits for the circuit design; and based on the redetermining of whether the circuit design exceeds the set of limits for the circuit design, remodifying one or more cell instances of the circuit design based on the current set of yield probability values and the path description data.

14. The non-transitory computer-readable medium of claim 1, wherein the operations comprise:

after the modifying of the one or more cell instances based on the current set of yield probability values and the path description data:

redetermining whether the circuit design exceeds the set of limits for the circuit design; and in response to determining that at least one limit in the set of limits has been exceeded, generating a report that describes a latest set of yield probability values of the circuit design.

15. The non-transitory computer-readable medium of claim 1, wherein the set of limits includes at least one of a power limit for the circuit design, an area limit for the circuit design, or a target yield probability value for the circuit design.

16. The non-transitory computer-readable medium of claim 1, wherein the operations comprise:

after the modifying of the one or more cell instances based on the current set of yield probability values and the path description data:

determining whether a runtime of at least a portion of the operations has exceeded a runtime limit; and in response to determining that the runtime of at least a portion of the operations has exceeded the runtime limit, generating a report that describes a latest set of yield probability values of the circuit design.

17. The non-transitory computer-readable medium of claim 1, wherein the operations comprise:

after the modifying of the one or more cell instances based on the current set of yield probability values and the path description data:

determining whether the modifying of the one or more cell instances has been performed more than a predetermined number of times and resulted in a yield probability value improvement that is less than a predetermined improvement threshold; and in response to determining that the modifying of the one or more cell instances has been performed more than the predetermined number of times and resulted in the yield probability value improvement being less than the predetermined improvement threshold, generating a report on a latest set of yield probability values of the circuit design.

18. The non-transitory computer-readable medium of claim 1, wherein the operations comprise:

performing static timing analysis on the circuit design to generate the static timing analysis data.

19. A device comprising:

a memory storing instructions; and a hardware processor communicatively coupled to the memory and configured by the instructions to perform operations comprising:

performing static timing analysis on a circuit design for an integrated circuit to generate static timing analysis data;

generating a current set of yield probability values for the circuit design based on the static timing analysis data for the circuit design;

generating path description data that describes a set of paths of the circuit design used in the generating of the current set of yield probability values, and describes a set of yield probability loss values associated with the set of paths;

determining whether the circuit design exceeds a set of limits for the circuit design; and in response to determining that the circuit design does not exceed any limit in the set of limits, modifying one or more cell instances of the circuit design based on the current set of yield probability values and the path description data.

20. A method comprising:

generating, by a hardware processor, a current set of yield probability values for a circuit design of an integrated circuit based on static timing analysis data for the circuit design;

generating, by the hardware processor, path description data that describes a set of paths of the circuit design used in the generating of the current set of yield probability values, and describes a set of yield probability loss values associated with the set of paths;

determining, by the hardware processor, whether the circuit design exceeds a set of limits for the circuit design; and in response to determining that the circuit design does not exceed any limit in the set of limits, modifying, by the hardware processor, one or more cell instances of the circuit design based on the current set of yield probability values and the path description data.

* * * * *